United States Patent [19]
Price et al.

[11] Patent Number: 5,171,771
[45] Date of Patent: Dec. 15, 1992

[54] PERMANENT FOGGING SYSTEM FOR GAS MAINS

[75] Inventors: Andrew Price, Hythe; Terrence R. Baldwin, Romsey, both of England

[73] Assignee: National Starch and Chemical Investment Holding Corporation, Wilmington, Del.

[21] Appl. No.: 619,557

[22] Filed: Nov. 29, 1990

Related U.S. Application Data

[62] Division of Ser. No. 370,976, Jun. 26, 1989, Pat. No. 4,994,307.

[51] Int. Cl.⁵ ................................................. C08K 5/06
[52] U.S. Cl. ..................... 524/377; 523/176; 524/387; 524/388; 524/762; 524/765; 524/766; 526/209; 526/210; 526/211; 526/212
[58] Field of Search .............. 524/762, 765, 766, 377, 524/388, 387; 526/209, 210, 211, 212; 523/176

[56] References Cited

U.S. PATENT DOCUMENTS

| | | | |
|---|---|---|---|
| 3,457,212 | 7/1969 | Fukuoka et al. | 523/176 |
| 4,068,033 | 1/1978 | Meade | 428/201 |
| 4,331,722 | 5/1982 | Packo et al. | 428/35 |
| 4,410,644 | 10/1983 | Bunyan | 523/176 |
| 4,505,613 | 3/1985 | Koga | 405/154 |
| 4,731,982 | 3/1988 | Grant et al. | 156/94 |
| 4,845,151 | 7/1989 | Sivy | 524/762 |

OTHER PUBLICATIONS

British Gas, "Gas Conditioning With Monoethylene Glycol (MEG)," London Research Station, 1988, pp. 1–39.

*Primary Examiner*—Paul R. Michl
*Assistant Examiner*—John J. Guarriello
*Attorney, Agent, or Firm*—Eugene Zagarella, Jr.; Edwin M. Szala

[57] ABSTRACT

A permanent fogging system comprising a selected amount of a reactive free-radical polymerizable acrylic or substituted acrylic monomer, a low molecular weight glycol carrier and an effective amount of a free radical initiator.

Another embodiment involves a method of sealing a pipeline by spraying or applying the fogging or misting system described above.

10 Claims, No Drawings

PERMANENT FOGGING SYSTEM FOR GAS MAINS

This application is a division of application Ser. No. 07/370,976, filed Jun. 26, 1989 U.S. Pat. No. 4,994,307.

BACKGROUND OF THE INVENTION

This invention relates to the sealing of cracks and other points of leakage in joints in underground pipes and mains, and particularly gas mains, and permanent fogging or misting systems for use therein.

The sealing of leaks in gas mains and other underground pipelines presents major problems in an area where demand is growing rapidly due to deterioration of such pipelines, which, in many places such as the United Kingdom and the United States, have been in place and in use for many years. Over that time the pipes, which are mainly cast iron, have become porous or have cracked for a variety of reasons such as age, corrosion, subsidence of surrounding soil, and the passage of heavy trucks and other vehicles over roads under which the underground pipes are buried. This leakage can lead to dangerous situations, and in extreme cases explosion and bodily harm or even fatalities. Moreover, the scale of the problem can be so huge that the digging up and replacement of the old and broken mains becomes an economic impossibility, and in many cases where, for example, the pipeline passes under a building, also a physical impossibility. Therefore, it is of considerable benefit if such pipelines can be repaired, rather than having to be replaced when the pipeline becomes unusable, particularly because of leaks, cracks or fissures in joints.

Various methods have been used and proposed in the past for the repair of underground pipelines. Where the pipeline is accessible, methods have involved exposing the pipeline and either replacing the broken or porous section with a new section, or, where that is not possible or economical, applying a sealant coating, e.g. a polyurethane coating, around the exterior of the pipe.

An alternative method, used particularly on relatively small diameter pipelines such as those supplying gas to domestic premises, is to feed a new, smaller diameter flexible plastics pipe through the gas main, which then simply acts as a conduit to accommodate the smaller diameter plastics replacement pipeline inside the previously existing pipeline, In such a method, the gas supply is to the plastics replacement pipeline, rather than to the existing, broken, cracked or corroded pipeline. This method of inserting a new pipeline inside the old is a quick, easy and inexpensive method of repair, but is of limited applicability because of the reduced capacity of the inserted smaller diameter pipeline, as compared with that of the original pipeline.

Various methods and compositions have also been tried in the past for the in situ repair of underground pipelines. Such methods, in general include using either injection or spraying sealant material inside the pipeline at the point of fracture or a fogging technique in which a sealant is introduced into the pipeline as a fog or mist, the suspended droplets of which deposit on the inside of the pipelines to seal any cracks or fissures therein.

One leakage control technique that has been used is the fogging of gas mains, particularly those having lead-yarn joints, with ethylene glycol or diethylene glycol. These glycol materials swell the yarn in the lead-yarn joints and temporarily regenerate the seals in such joints. However, the problem with glycol based fogs is the temporary nature of the seal, since the glycol is eventually extracted by the gas and leaks can then re-occur. One way to avoid this problem is by employing a gas conditioning system wherein e.g. a monoethylene glycol vapor is supplied to the line on a continuous basis to keep the yarn saturated and in the swelled condition. While this approach has been fairly effective, it does require considerable effort to insure an effective system is being maintained. Additionally, as glycol prices rise, this operation can be somewhat costly because of the need for a constant supply of a glycol material. Therefore, a system providing a permanent seal would be advantageous.

Other fogging systems and sealants such as anaerobic adhesives have been tried and while they could be applied as a fog and provide permanently sealed joints, they enter the mechanical portions of the system, i.e. the seal and lock mechanism associated with gas mains, and stop them from working.

Accordingly, there is the need for an effective and permanent gas sealing system which is particularly useful in the sealing of gas mains and other underground pipelines.

SUMMARY OF THE INVENTION

The present invention provides a permanent fogging system comprising a selected amount of a reactive resin system and a carrier which is compatible and non-reactive with the reactive resin, is capable of swelling yarn or seals in other type joints and has a low enough viscosity to permit the system to be applied as a fog or mist. More particularly, the fogging system of this invention comprises up to about 50% by weight of a free radical polymerizable acrylic or substituted acrylic monomer, a low molecular weight glycol carrier and an effective amount of a free radical initiator to initiate polymerization of the acrylic monomer.

Another embodiment of this invention involves a method of sealing a pipeline by spraying or applying the fogging or misting system described above.

DETAILED DESCRIPTION OF THE INVENTION

In accordance with one aspect of this invention a novel permanent fogging system is provided comprising a selected amount of a reactive free radical polymerizable acrylic or substituted acrylic monomer; a carrier which is compatible and non-reactive with the reactive monomer, is capable of swelling yarn or seals in other type joints and has a suitable rheology including viscosity which permits the system to be applied as a fog or mist; and an effective amount of a free radical initiator. This combination of reactive resin plus a carrier, besides having the properties that will allow it to be applied as a fog or mist, provides a satisfactory permanent seal and yet is of low enough strength so as not to effect the mechanical operation of any of the working components such as seals, locks and valves.

The main and important characteristics of the fogging system of this invention are that it is a liquid of relatively low viscosity permitting it to be applied as a spray or fog and includes a carrier which is compatible with the reactive resin, non-reactive and capable of swelling the yarn in lead-yarn type joints and permits the reactive resin to be used at a level which will provide a low strength but effective permanent seal. This system while particularly useful in operations when lead/yarn joints are involved is also useful in other applications such as those having other type seals and having rubber components e.g. rings, gaskets, valves, etc.

The reactive resin component useful in the invention is a free radical polymerizable acrylic or substituted acrylic monomers (S). These monomers which include both the acrylic and methacrylic counterparts can be represented by the following formula:

$$(CH_2=\overset{R}{\underset{|}{C}}-COO)_m R_n^1 \quad (I)$$

where R is H or $CH_3$, $R^1$ is a mono- or polyvalent organic group, m is an integer of 1 or more depending on the nature of the $R^1$ group and n is an integer of 1 or more. Particularly preferred are the monofunctional acrylates where m is 1 and more particularly the methacrylates where R is $CH_3$ and m is 1.

Typical monomers of this type are the monofunctional acrylate and methacrylate esters and the hydroxy, amide, alkoxy, cyano, chloro and silane substituted derivatives thereof. Such monomers include methyl acrylate, methyl methacrylate, ethyl acrylate, hydroxyethyl methacrylate, hydroxypropyl acrylate, hydroxypropyl methacrylate, polypropylene glycol methacrylate, butyl acrylate, n-octyl acrylate, 2-ethylhexyl acrylate, decyl methacrylate, dodecylmethacrylate, cyclohexyl methacrylate, tert. butylmethacrylate, acrylamide, N-methylolacrylamide, diacetone acrylamide, N-tert. butyl acrylamide, N-butoxy acrylamide, 2-ethoxy ethyl methacrylate, gamma-methacryloxypropyl trimethoxy silane, 2-cyanoethyl acrylate, 3-cyanopropyl acrylate, tetrahydrofufuryl chloroacrylate, glycidyl acrylate, etc.

Another group of monomers of the type (I) are those derived from dihydric and polyhydric alcohols such as the glycols and glycerols. Illustrative monomers of this type include ethylene glycol diacrylate, ethylene glycol dimethacrylate, polyethylene glycol diacrylate, diethylene glycol dimethacrylate, trimethylol propane trimethacrylate, pentaerythritol triacrylate and other polyether di- and poly- acrylates and methacrylates.

Another class of polymerizable monomers of this type are the esters derived from dicarboxylic acid/anhydride, dihydric alcohol and acrylic/methacrylic acid. Typical monomers of this class include, for example, dimethacrylate of bis(ethylene glycol) maleate, dimethacrylate of bis(diethylene glycol) phthalate, dimethacrylate of bis(tetraethylene glycol) phthalate, dimethacrylate of bis(tetraethylene glycol) sebacate, dimethacrylate of bis(tetraethylene glycol) maleate and the diacrylates and chloroacrylates corresponding to said dimethacrylates, etc.

Another group of monomers of the general type (I) are the isocyanate-hydroxyacrylate or isocyanate-aminoacrylate reaction products which may be characterized as acrylate terminated polyurethane and polyureides or polyureas. Still another group of representative monomers of this type are the mono- and polyacrylate esters of bisphenol type compounds, such as the diacrylate and dimethacrylate esters of bisphenol A and of 4,4'-bishydroxyethoxy-bisphenol A.

The monomers of the type (I) which are useful herein, are further described in U.S. Pat. No. 4,602,073 issued Jul. 22, 1986. These monomers are polymerizable monomers having one or more acrylic or substituted acrylic groups as a common, unifying characteristic, and for convenience may be generically termed acrylic and substituted acrylic monomers.

Especially useful acrylic monomers are the alkyl and cycloalkyl acrylates and methacrylates having 1 to 18, preferably 1 to 6 carbon atoms in the ester moiety and particularly those containing polar hydroxyl, ether (i.e. polyoxyalkylene), cyano and chloro groups.

In preparing the fogging system and the reactive resin compositions, it is within the scope of the present invention that the required acrylic monomer may be a mixture of acrylic monomers rather than a single acrylic monomer, and there may also be utilized in combination therewith, other non-acrylic, ethylenically unsaturated copolymerizable comonomers such as unsaturated hydrocarbons, The carrier used in the fogging or mist system will be a material that is compatible with the reactive resin, non-reactive, capable of swelling yarn and has reology including a low enough viscosity to permit system to be fogged or sprayed. Useful carriers include the glycols and diols and short chain hydrocarbons such as those having up to 8 carbon atoms. The glycols or diols which are useful are generally the low molecular weight glycols or polyglycols sometimes referred to as simple glycols and lower polyglycols and which can be represented by the following formula:

$$H(OC_nH_{2n})_xOH$$

where n is 2 to 4 and x is 1 to 4. More particularly, the glycol will comprise a total number of carbon atoms which will maintain the desired properties of the carrier and have a relative low molecular weight of less than about 200 and preferably less than about 150. Compounds of this type are ethylene glycol, diethylene glycol, triethylene glycol, propylene glycol and tripropylene glycol. Preferred glycols are ethylene glycol and diethylene glycol.

The composition of this invention also will include a free radical initiator to initiate polymerization of the reactive monomer component. These initiators which are well known and conventionally used are primarily organic peroxides and aliphatic azo compounds. Illustrative of such initiators are the diacyl peroxides such as benzoyl peroxides; dialkyl peroxides such as di-tert-butyl peroxide; ketone peroxides such as methylethyl ketone peroxide; and peresters which readily hydrolyze, e.g. tert.-butyl peracetate, tert.-butyl perbenzoate, di-tert.-butyl diperphthalate etc. A particularly useful class of peroxy initiators are the organic hydroperoxides such as cumene hydroperoxide, methylethyl ketone hydroperoxide, tert.-butyl hydroperoxide etc. Especially preferred as initiator is cumene hydroperoxide. Other useful initiators are the azonitrile compounds such as azobisobutyronitrile and (tert. butyl azo) isobutyronitrile and carbonyl containing ultraviolet activated free radical generators such as acetophenone, benzophenone and the benzion ethers.

In the fogging/mist systems of this invention, an important consideration is the level of reactive resin monomer employed. It must be maintained at a level which while effective in providing a permanent sealant is low enough so that it will not interfere with the working of any mechanical mechanism, i.e. the resulting gel would be of relatively low strength. While the amount of reactive resin will vary to some extent depending on the particular material used, it generally will comprise up to about 50% by weight of the system and preferably will be from about 5 to 30% by weight, more preferably from about 5 to 20% by weight. The glycol carrier can vary from about 40 to 95% by weight and preferably from about 50 to 95% by weight. The free radical initiator will comprise an effective amount, more particularly about 0.01 to 10% and preferably from about 0.1 to 5% by weight.

Other additives, modifiers and solvents may be included in the fogging system as long as they do not effect the rheology thereof and allow it to be applied as a mist or spray and still provide an effective permanent, low level sealant.

The application of the sealant composition of this invention may be by any conventional spraying, fogging or injection technique and may even be coated, brushed or applied directly to a substrate if the application permits. However, in its most useful application for which the compositions have been especially designed, it will be applied as a fog or mist. This will allow for the in situ application in underground gas mains and pipelines and other areas having a remote or relatively inaccessible location. A fog or mist is a suspension of liquid droplets in gas, i.e. an aerosol, and the size of the droplets range from colloidal to macroscopic. Fogs or mists can be provided by many different types and combinations of conventional equipment such as foggers, ultrasonic atomizers, spargers and evaporators.

In one particular aspect of the present invention, a method of sealing leaks in underground gas mains and other pipelines is provided by fogging or misting a sealant composition comprising a reactive resin monomer and a glycol carrier of the type described herein, into a downstream location of the respective gas mains or pipelines.

The following example is further illustrative of this invention and is not intended to be construed as a limitation thereof. In this example, all parts or percents (%) are by weight, unless otherwise noted.

EXAMPLE I

A sealant composition was formulated comprising 79% by weight ethylene glycol, 20% by weight of polypropylene glycol monomethacrylate and 1% by weight of cumene hydroperoxide. To evaluate the strength of the cure and seal, a "finger-tight" lock test known in the art was performed. About 2 or 3 drops of the composition was placed on the exposed threads of an M-8 bolt (degreased) and immediately thereafter a nut (degreased) with mating threads was run onto the bolt so that the nut was directly in the thread area of the applied composition. A measurement was made after a time period of 24 hours at a temperature of 25° C. and the lock was found to be finger tight, i.e. a degree of polymerization occured measured by the resistance of the nut to be turned. For comparison purposes, a composition comprised of 100% of ethylene glycol was applied to an M-8 bolt and nut and evaluated in the same manner and showed no cure after the 24 hour period.

Another composition was formulated comprising 78.7% by weight of diethylene glycol, 20% by weight polypropylene glycol monomethacrylate, 1% by weight of cumene hydroperoxide and 0.3% by weight of NNDMPT (N,N-dimethyl-paratoluidine). This composition was evaluated in a "fingertight" lock test as described above and again after 24 hours a degree of polymerization occured to effect a figer tight seal as compared to an applied composition which comprised 100% diethylene glycol and showed no cure after the 24 hour period.

What is claimed is:

1. A permanent fogging composition comprising up to about 50% by weight of a free radical polymerizable acrylic or substituted acrylic monomer, from about 40 to 95% by weight of a low molecular weight glycol or polyglycol carrier which has a molecular weight of less than about 200, is compatible and non-reactive with the free radical monomer, is capable of swelling yarn or seals in other type joints and has a viscosity which permits the composition to be applied as a fog or mist, and an effective amount of a free radical initiator.

2. The composition of claim 1, wherein the glycol or polyglycol carrier has the formula:

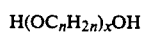

$$H(OC_nH_{2n})_xOH$$

where n is 2 to 4 and x is 1 to 4.

3. The composition of claim 2 wherein the acrylic monomer is an ester of the formula:

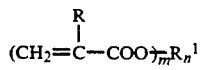

$$(CH_2=\overset{R}{\underset{|}{C}}-COO)_{\overline{m}}R_n^1$$

where R is H or $CH_3$, $R^1$ is a mono- or polyvalent organic group, m is an integer of 1 or more depending on the nature of the $R^1$ group and n is an integer of 1 or more.

4. The composition of claim 3, wherein m in the acrylic monomer is 1 and R is $CH_3$.

5. The composition of claim 3, wherein the acrylic monomer component is present in an amount of from about 5 to 30% by weight and the glycol carrier is present in an amount of from about 50 to 95% by weight.

6. The composition of claim 5, wherein the acrylic monomer component is an alkyl or cycloalkyl acrylate or methacrylate having 1 to 6 carbon atoms in the ester moiety.

7. The composition of claim 5, wherein the glycol carrier is ethylene glycol or diethylene glycol.

8. The composition of claim 7, wherein m in the acrylic monomer is 1 and R is $CH_3$.

9. The composition of claim 7, wherein the acrylic monomer component is present in an amount of from about 5 to 20% by weight and the glycol carrier has a molecular weight of less than about 150.

10. The composition of claim 8, wherein the acrylic monomer is polypropylene glycol methacrylate.

* * * * *